United States Patent [19]

Clavelloux et al.

[11] 4,104,912
[45] Aug. 8, 1978

[54] SYSTEM FOR TAKING CURRENT-METERING MEASUREMENTS

[75] Inventors: Noël Clavelloux; Francois Peynaud; Gilles Posseme, all of Paris, France

[73] Assignee: Thomson-CSF, Paris, France

[21] Appl. No.: 782,701

[22] Filed: Mar. 30, 1977

Related U.S. Application Data

[63] Continuation-in-part of Ser. No. 700,157, Jun. 28, 1976, abandoned.

[30] Foreign Application Priority Data

Jul. 1, 1975 [FR] France ................. 75 20646

[51] Int. Cl.² ............................................. G01W 1/00
[52] U.S. Cl. ..................................... 73/189; 73/170 A
[58] Field of Search ............... 73/189, 181, 170 A, 73/170 R; 340/3 D

[56] References Cited

U.S. PATENT DOCUMENTS

| | | | |
|---|---|---|---|
| 1,864,638 | 6/1932 | Chilowsky | 73/181 |
| 3,435,677 | 4/1969 | Gardner | 73/189 |
| 3,818,425 | 6/1974 | Peynaud et al. | 340/3 D |
| 3,936,824 | 2/1976 | Aker et al. | 343/8 |

OTHER PUBLICATIONS

N. Bowditch, American Practical Navigator, pp. 259-260, 1943.

*Primary Examiner*—Anthony V. Ciarlante
*Attorney, Agent, or Firm*—Oblon, Fisher, Spivak, McClelland & Maier

[57] ABSTRACT

A system on board which provides measurement of flow rates of a liquid layers at different depths, the provided results being corrected from error due to the craft movement, said system being proper for location and establishment of an underwater drilling site.

In this system arrangement, are combined to cooperate a Doppler sonar system providing the craft speed with respect to the sea bottom and a flow rate meter system providing the liquid flow rate by reference to the craft, a common electro-acoustic transducers unit being switched for sequential operation from sonar to flow rate system and an output data processing system derives from these two measures the values of flow rate with respect to the sea bottom.

9 Claims, 6 Drawing Figures

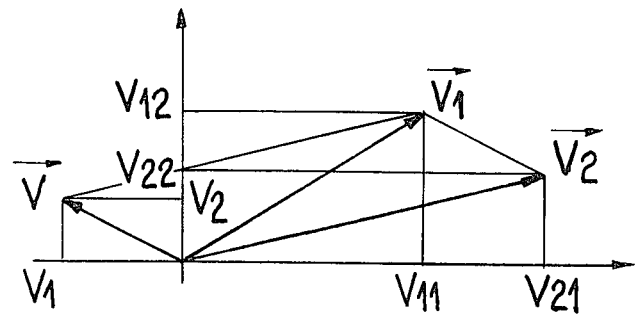
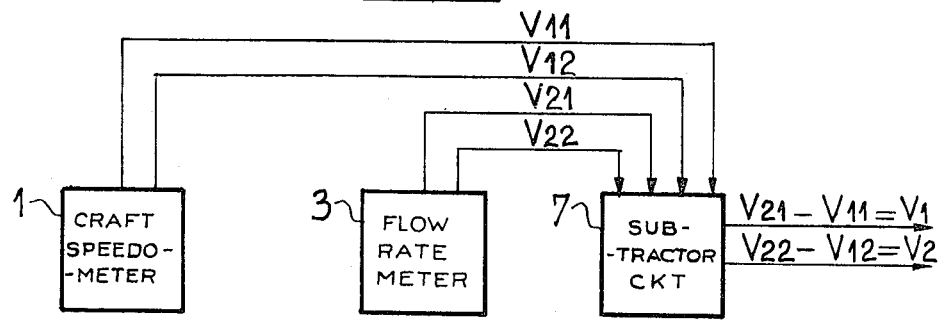
PRIOR ART
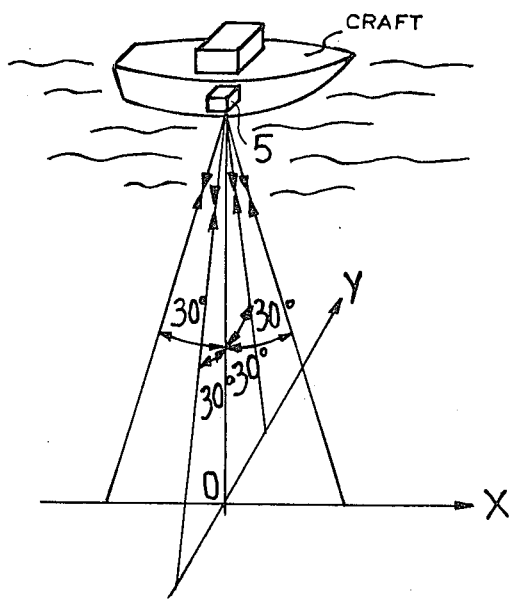

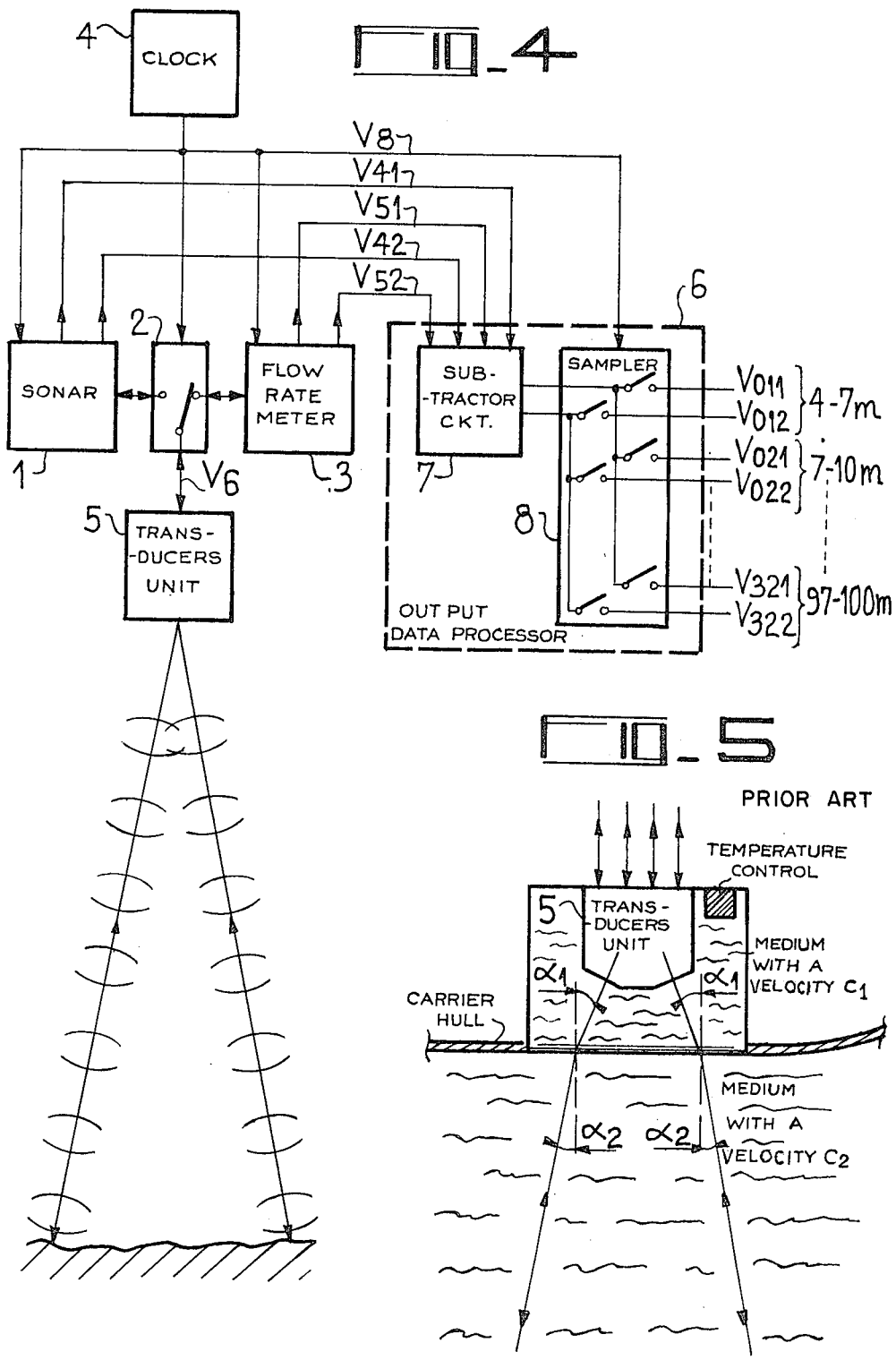

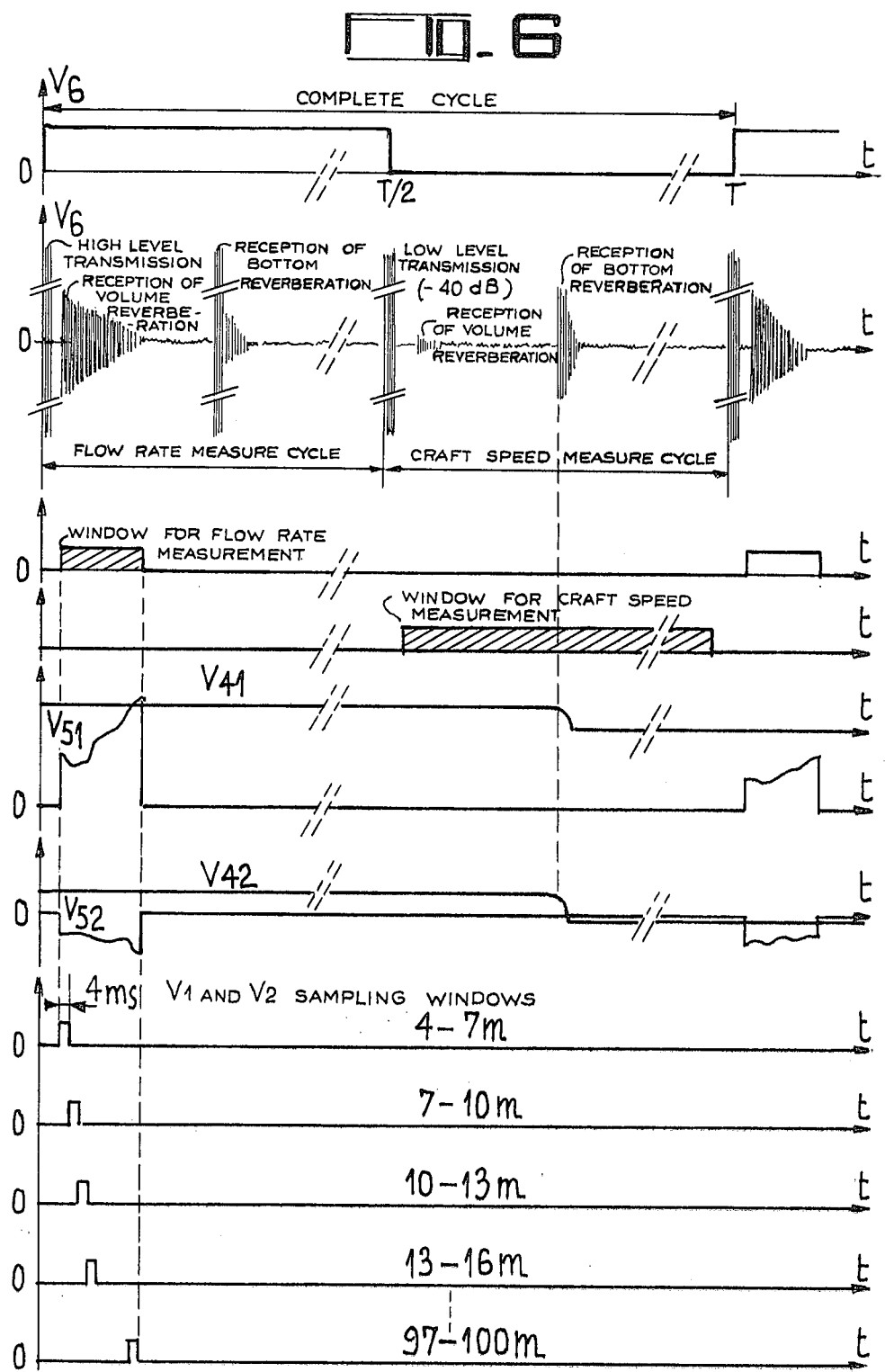

SYSTEM FOR TAKING CURRENT-METERING MEASUREMENTS

CROSS-REFERENCE TO RELATED APPLICATIONS

This is a Continuation-In-Part of Application Serial No. 700,157 filed June 28, 1976 and now abandoned.

The present invention relates to a system for determining a fluid flow rate. It relates more particularly to a measurement system which enables the determination of the speed and direction of movement of a body of fluid, such as a current which exists within a liquid, the Doppler effect being used for carrying out the measurements from a moving craft.

It should be pointed out that it has become necessary to discover the characteristics of the currents which exist in liquid layers at different depths in shallow waters, in particular for the purposes of exploiting the underwater bed and/or ground under the bed.

An invention in the prior art, disclosed in U.S. Pat. No. 3,435,677, relates to a system for measuring the direction and velocity of currents in a liquid medium by comparing changes in frequency of signals between sensors which are selectively spaced apart and submerged in the medium.

Another electronic measuring system based on Doppler effect and which forms a flow rate meter is known, inter alia, from a French patent filed by the present Applicant under No. 72 03320 and published as No. 2,170,807. This system provides the two relative components of the flow rate of water layers with respect to the craft and, by subtracting the vector for speed with respect to the underwater bed, makes it possible to deduce the speed of the fluid current in magnitude, direction and distribution.

Further, namely in an U.S. Pat. No. 3,818,425, filed by the present Applicant, there is described a navigation system which employs the Doppler effect and which enables the two longitudinal and transverse components of the speed of the craft to be obtained with respect to the sea bottom.

This Doppler sonar navigation system comprises an onboard acoustic waves transmit and receive electro-acoustic transducers device; transmission and reception take place in a manner known per se in four directions with beams equally inclined in respect to the vertical and located in two mutually perpendicular planes, the receiving electro-acoustic transducer elements being located upon the focal sphere of a spherical acoustic lens. The assembly is enclosed within a casing filled with a fluid medium having a known ultrasonic wave propagation velocity dependent on the fluid temperature, the latter being controllable. The transducers are directed towards the casing base which is transparent to the ultrasonic waves. The casing is secured to the vessel hull and said base is in contact with supporting water.

However, neither of these systems used separately does not provide the possibility of determining the speed characteristics with respect to the sea bottom of a current existing within a body of liquid, without using either fixed immersed apparatus or requiring that the measurements be carried out only when the craft carrying the measuring equipment is motionless.

It is one object of the present invention to provide a possibility to determine correctly the flow rate of liquid layers at different depths.

Such a problem arises when it is sought to know the flow rate $\vec{V}$ with respect to the liquid bottom, i.e. within determined reference marks, of a sea current when a flow rate metering system is on-board of a craft moving with a speed $\vec{V}_1$ by reference to sea bottom, this speed causing disturbance in the flow rate measure; this disturbance appears in an equation:

$$\vec{V}_2 = \vec{V} + \vec{V}_1$$

where $\vec{V}_2$ is the sea current, as related to the craft and which is provided by the flow rate meter on-board.

For a better understanding of the problem an explicative illustrating diagram is represented on FIG. 1.

If the reference axes are, the OX axis following the craft forward movement which is in the same direction as the X axis of the flow rate meter, and the OY axis perpendicular to OX axis in a horizontal plane, the sought true flow rate $\vec{V}$ will be derived by its two horizontal components $V_1$ and $V_2$ from two equations:

$$V_1 = V_{21} - V_{11}$$

and $$V_2 = V_{22} - V_{12}$$

which relate respectively to the longitudinal and to the transversal projections of three vectors $V$, $V_1$ and $V_2$.

Another object of the invention is to provide an improved flow rate system, the operation of which is advantageously implemented for example by means of the two above mentioned prior art systems disclosed by the Applicant, the systems being combined to cooperate through a switching means, a common electro-acoustic transducers unit and an output data processor, wherein the determination of currents in liquid layers is possible from a moving craft having the entire system on-board.

Such measurements of currents within a liquid are of prime importance, particularly in cases where the underwater bed is to be prospected, build on and exploited, for example in the case of undersea drilling.

Other features and advantages of the invention will become apparent from the following description, given by way of example, with reference to the appended drawings in which:

FIG. 1 is a diagram representing vectors for different speeds and essentially intended to facilitate a better understanding of the invention;

FIG. 2 is a synoptic diagram in blocks form of the basic of the flow rate metering system in accordance with the invention;

FIG. 3 is a synoptic schematically illustrating a prior art flow rate system;

FIG. 4 is a block diagram of an on-board flow rate metering system according to the invention;

FIG. 5 is a synoptic schematically illustrating a prior art electro-acoustic transducers unit in a Doppler sonar navigation system implemented for determining the components of speed of the craft; and FIG. 6 is a diagram of operation versus time of the metering system.

Briefly stated, the system proposed uses the synoptic block diagram of FIG. 2 as the basic of the flow rate metering system. The system essentially comprises means in a cooperating combination and advantageously of conventional embodiments:

a flow rate meter 3, which measures sea current components $V_{21}$ and $V_{22}$ with respect to the craft, a craft speedometer 1, which measures the craft components $V_{11}$ and $V_{12}$ by reference to fixed axes, and a subtractor circuit 7 carrying out arithmetic calculus which gives the differences between $V_{21} - V_{11}$ and $V_{22} - V_{12}$.

It is worth to note that the proposed system is operable by combining any known system as meter 3, if it provides the two horizontal components of the sea current flow rate with respect to the craft, with any known system as speedometer 1 if this latter provides the two horizontal components of the craft speed with respect to fixed reference marks.

When data of measured values $V_{11}$, $V_{12}$ and $V_{21}$, $V_{22}$ is continuously provided, the substractor circuit 7 is a simple analogical subtraction circuit and the two sought datas $V_1$ and $V_2$ are also continuously provided.

As previously stated, the system embodiment advantageously utilises known per se equipment and namely in a preferred arrangement, the measuring systems disclosed in previously cited French Pat. No. 2,170,807 and in U.S. Pat. No. 3,818,425. The system comprises, FIG. 4, a sonar apparatus 1 used as craft speedometer and a sea current metering apparatus, or flow rate meter 3, which are each divided into a transmission section and a reception section, which latter feeds an output data-processing device 6.

In said French Pat. No. 2,170,807, synoptically illustrated in FIG. 3, is described a flow rate device based on Doppler effect produced by volume reverberation, i.e. by the signal returned by the medium heterogeneities. In this device four electro-acoustic transducers are inclined in respect to the vertical axis and mounted in two mutually perpendicular planes; the received signals from transducers are processed to provide the two horizontal components of the current speed of a water layer lying below said device.

On the other hand, in said U.S. Pat. No. 3,818,425, synoptically illustrated in FIG. 5, is described the craft speedometer by reference to the sea bottom which is also based on the Doppler effect of the signal reflected from the bottom. This device utilizes four electroacoustic transducers inclined in respect to the vertical axis, as in the above cited French patent, but mounted within a container transparent for ultrasonic waves and filled with a fluid medium the physical properties of which make the velocity of ultrasonic waves propagation dependant on the medium temperature which is stabilized at a selected value adjustable by a temperature control means.

Returning now to the system arrangement, the latter further comprises a controlled switch means 2 advantageously embodied by any convenient conventional logic circuit. The switch terminals are connected to the corresponding terminals of sonar 1 and flow rate meter 3; the connections lines on the drawing have an arrow oriented towards switch 2 to indicate the transmission period of operation and an oppositely oriented arrow indicates the reception period.

Another terminal of switch 2 is connected to an acoustic unit 5, as indicated by a connection which carries arrows symbolising transmission or reception depending upon their direction. This unit is advantageously formed by a set of electroacoustic transducers for reception which are arranged within a liquid lens and by a set of emitting transducers, these two sets being arranged within a sealed container filled with a liquid. The velocity of propagation in the liquids employed depends on the temperature of the liquids, which is regulated and adjustable. Such an arrangement is described in the aforementioned U.S. Pat. No. 3,818,425.

In addition, a master timer or clock 4 is connected to the sonar 1, the switch 2 and the flow rate meter 3. This arrangement makes it possible to use the same clock to control the system operation as a transmitter and as a receiver of each of the pieces of equipment which are connected sequentially to the transducers unit 5 by the switch 2, whose switching cycle is slaved to the predetermined period To of the clock signal.

Thus, using a switcheable common transmit-receive unit it is possible to provide a relative flow rate measurement since not corrected in respect to the craft own speed, and an accurate craft speed as obtained from Doppler sonar; as is apparent to those skilled in the art, the true flow rate characteristics of the liquid is then derived by subtracting from the measured flow rate components the determined craft speed components, the calculation being carried in any convenient subtraction circuit provided in above mentioned data processing device 6.

A preferred embodiment of the system has the following characteristics:

operating frequency: 300 kHz, range for measuring the craft speed over the bottom: approximately 150m, range for measuring the liquid flow rate: approximately 100 m, number of flow rate measuring points: 32, i.e. one measurement every 3 meters of layers depths difference;

accuracy of measurement: 1% with a limit of approximately 1/100 knot.

An example of a complete cycle of operations briefly comprises:

the system being activated and the flow rate meter 3 being connected through the switch 2, as shown, to the transducers unit 5, the transmitting transducers excited by signals from the flow rate metering system radiate acoustic energy in the liquid medium; the receiving transducers receive the energy reflected from particles in the liquid layers which is transferred to processing circuits of the flowmeter where the flow rate is computed, this operation being carried in conventional manner during a predetermined cycle with a duration To at least equal to the largest transmission-reception time.

At the end of this cycle To, the control signal from the master clock 4 activates the sonar system 1 which is simultaneously connected through switch 2 to the transducers unit 5 just previously disconnected, acoustic energy is radiated, reflected, received and then processed and computed to derive the speed of the craft, the conventional operation being carrier during a cycle of the same duration To.

The successive operations alternating sequentially, the obtained values of flow rate and craft speed are processed in any convenient conventional subtracting means for deriving the sought liquid flow rate values, said subtractor circuit being a part of an output data processor 6.

A complete preferred embodiment will be described now by reference to the drawings FIG. 4 in which one single electroacoustic transducers unit 5 is commonly used for both cooperating systems 1 and 3.

The already above mentioned unit, FIG. 5, comprises an assembly of four transmit and four receive transducers operating alternately for transmission and for reception and mounted within a housing filled with a fluid, such as conventionally used castor or silicone oil, the temperature of which is controlled, thus correcting the measurements made in accordance with the velocity $c_2$ of the sea medium at the moment of these measurements.

Each of the unit 5 transducers is sequentially switched on one and then on the other of the two systems 1 and 3 by means of the controlled switch 2. A clock 4, the period of which determines the complete cycle of the measurement, controls the switch 2 and the respective half cycles of measurement of each system 1 and 3. The duration of a complete cycle is about 0.5 seconds and of each half cycle about 0.25 seconds. During each half cycle the systems 1 and 3 determine the respective components of speeds $\vec{V}_1$ and $\vec{V}_2$ which, applied in the output data processor 6 to the subtraction circuit 7, produce the components of the sought speed $\vec{V}$. A conventional sampling circuit 8, controlled by the clock 4 signal, provides during each complete cycle of operation the flow rate measuring points of 32 pairs of values of $\vec{V}$ sampled each 4 ms, i.e. within fluid layers thickness of about 3 meters.

The clock 4, having a period T of about 0.5 seconds, is connected to the switch 2, to the flow rate meter 3 and to the sonar system used as craft speedometer 1. The complete cycle of 0.5 seconds is divided in two half cycles, each of about 0.25 seconds in duration.

At the beginning of a cycle, the clock 4 controls different circuits operation and connects, through the switch 2, the four transducers of the unit 5 to the corresponding terminals of the flow rate meter 3 and simultaneously actuates its transmit-receive cycle of operation. The diagrams of operation versus time are illustrated on FIG. 6, and clearly show the successive operations during this half cycle.

This half cycle operations begin by transmitting a short 300 kHz frequency signal of a high level since the returned energy by heterogeneities of the medium, and which is used for the measurement, is of a very low level. During this transmission, four receiving amplifiers comprised in system 3 are inoperative and remain in this state about 5 ms after the end of the transmitted signal. A window for flow rate measurement is then made available for a period of 128 ms during which the receiving amplifiers present their full sensitivity. During these 128 ms the four return signals received are processed in a known per se way to determine, with respect to the craft, the longitudinal component $V_{51}$ and the transversal component $V_{52}$ of the flow rate of the sea current such as exists at the vertical of the craft.

The amplifiers are then off operation till the end of the complete cycle. Thus, they do not receive the bottom return signal when, in the most encountered cases, this signal arrives after operation time of the reception window of the flow rate meter 3.

At the beginning of the second half cycle, the clock 4 signal connects, through the switch 2, the four transducers of unit 5 to the corresponding terminals of sonar system 1 used for craft speedometer. This cycle operation begins by transmitting a short 300 kHz frequency signal of a low level since the returned energy by the bottom is 40 to 60 dB higher than the one returned by the heterogeneities of the sea medium. During this transmission, the four receiving amplifiers of system 1 are inoperative and remain in this state about 9 ms after the end of transmitted signal. A window for craft speed measurement is then made available for a period of 200 ms during which the four receiving amplifiers present their full sensitivity. When, at any moment within this 200 ms period, the energy returned by the bottom is received, the four signals are processed in a known per se manner and are detected with a sufficient time constant to get D.C. voltages $V_{41}$ and $V_{42}$ respectively corresponding to longitudinal and transversal craft speed components in respect to the sea bottom.

The output terminals of systems 1 and 3 are connected to respective input terminals of the subtractor circuit 7 of signal pair $V_{51}$ and $V_{41}$ on one hand, and $V_{52}$ and $V_{42}$ on the other hand.

The output data processor 6 further comprises a sampler 8 which operates on substractor 7 output signals. During the 128 ms period of operation of the reception window of system 3, this sampler is utilised for 32 measuring points, in other words 32 successive samplings are made, each during 4 ms, and are then sorted in 32 separate output pairs $V_{011}$ and $V_{012}, \ldots, V_{321}$ and $V_{322}$. For this purpose, the clock 4 signal is applied to the sampler 8 and, during the operation of the measurement window of the first half cycle, successively controls the state of its 32 gates, each for a period of 4 ms, thereby successively connecting the signal pair $V_1$ and $V_2$ to the respective outputs $V_{011}$ and $V_{012}, \ldots, V_{321}$ and $V_{322}$.

The flow rate meter signal issued from 3, corrected by subtraction in 7 of the craft speedometer signal issued from system 1, appears then at the output terminals of the sampler 8 on 32 separate channels, each channel comprising data on current speed in a water layer, the thickness of which is about three meters account being made of the sound velocity in water and of the windows duration.

Thus, the preferred example of embodiment of the proposed metering system can easily provide water currents measurements through a total liquid depth of about 96 meters.

A system embodiment, operated in accordance with the teaching of the invention, makes it possible to determine the characteristics of flow rate in liquid layers without using immersed apparatus and with the carrier craft moving. This represents a considerable technical advance in the so-called off-shore field, where such measurements are of fundamental importance.

What is claimed is:

1. A liquid flow rate metering system on board a craft providing results corrected for faults due to the craft movement comprising in a cooperating combination:
    a flow rate meter (3) for measurement of longitudinal and of transverse components of liquid flow rate by reference to the craft;
    a speedometer system (1) for determining longitudinal and transverse components of the craft speed with respect to the supporting liquid bottom; and
    an output data processor (6) for deriving from the flow rate and the speed measured values a value of longitudinal and of transverse components of the flow rate at relative layer distributions with respect to said bottom.

2. System in accordance with claim 1, wherein the said output data processor (6) comprises a subtraction circuit (7) for determining the difference between the flow rate value and the speed value of the craft.

3. System according to claim 1, wherein the flow rate meter (3) is an electro-acoustic flow rate meter based on the Doppler effect on volume reverberation and the speedometer (1) is an electro-acoustic system based on Doppler effect on reverberation on the sea bottom.

4. System according to claim 3, wherein the operating ultrasonic wave frequency is the same for both cooperating systems (3,1) and wherein a single electro-acoustic transducers unit (5) for transmission and for reception is sequentially connected to the terminals of the one, then of the other system through a switch (2) controlled by a clock (4).

5. System according to claim 4, wherein the transducers unit (5) is enclosed in a liquid medium filled housing, said medium having a given sound propagation velocity ($c_1$) and having controlled adjustable temperature for correcting measurement errors introduced by variations of the sound propagation velocity ($c_2$) within the craft supporting liquid medium.

6. System according to claim 5, wherein the corrected signals delivered at the output of the subtraction circuit (7) are divided into 32 measured points successively extracted to provide at said processor (6) output sea current speed values with respect to sea bottom of successive and contiguous water layers.

7. System according to claim 6, wherein a sampler (8) comprised in said processor (6) extracts said 32 measured values.

8. A liquid flow rate metering system on board comprising, in cooperation:
   a flow rate meter (3), based on Doppler effect for providing relative measurements of currents through a liquid medium,
   a Doppler sonar system (1), for determining the speed of moving craft in relation to the liquid bottom and further for correcting said flow rate relative measurements,
   a controlled switching means (2), for sequentially connecting said meter and said sonar system alternately to a single acoustic unit (5),
   a control means (4) for controlling said switching means operation and for actuating sequentially in turn the meter and the sonar system actually connected to said acoustic unit,
   the said acoustic unit (5) comprising groups of electroacoustic transmitting and receiving transducers mounted within a fluid medium filled sealed casing, which is inclined in relation to the vertical beam axes oriented towards acoustic waves transparent casing base in contact with craft supporting liquid medium, the velocity of acoustic waves in the filling fluid being controllable by regulated and adjustable temperature of said fluid,
   whereby the difference between the measured flow rate and the determined speed of the craft provides at the output of a data processing device (6) a true flow rate in magnitude, direction and relative layer distribution.

9. The combination in accordance with claim 8, wherein said control means (4) is a master clock and said switching means (2) is of logic circuits type, the switching from one position to the other being produced in a cycle with a duration (To) which is at least equal to the longest transmission-reception cycle of the actuated system element (1;3).

* * * * *